E. ALTENKIRCH

Aug. 22, 1933. ABSORPTION METHOD AND APPARATUS Re. 18,924

Original Filed Feb. 7, 1925

Inventor,
Edmund Altenkirch,
By Finnegan & Brown
Attys

Reissued Aug. 22, 1933

Re. 18,924

UNITED STATES PATENT OFFICE 18,924

ABSORPTION METHOD AND APPARATUS

Edmund Altenkirch, Fredersdorf, near Alt-Landsberg (Ostbahn), Germany, assignor, by mesne assignments, to The Hoover Company, North Canton, Ohio, a Corporation of Ohio Original No. 1,615,353, dated January 25, 1927, Serial No. 7,696, February 7, 1925, and in Germany February 14, 1924. Application for reissue July 20, 1927. Serial No. 207,281

17 Claims. (Cl. 62—119.5)

My invention relates to improvements in absorption apparatus and more particularly to refrigerating apparatus.

In absorption apparatus it is known to circulate the gaseous contents of the evaporator and the absorber so that admixed gases which are not absorbed by the absorption liquid do not interfere with the absorption of the working refrigerating medium or cooling agent. In the known apparatus of this kind the foreign gas or auxiliary agent, preferably air, is intentionally mixed with the working medium or refrigerant in the evaporator and absorber in order that the same pressure should prevail therein as in the boiler and condenser. Frequently air enters the absorber accidentally, particularly in appartus which work at pressures lower than atmospheric pressure, and thereby considerably reduces the refrigeration efficiency. Also in this case the drawback is eliminated by a circulation of the above described kind. Frequently it will suffice to keep merely the gases contained in the absorber in constant circulation so that no separating layer of a neutral gas can form between the absorption liquid and the gas to be absorbed.

In the known apparatus, the circulation of the gaseous medium is effected by means of a fan. This arrangement has the drawback that a mechanical drive is necessary and that the shaft of the fan must be passed through the wall of the apparatus which gives cause for breakdowns owing to the leakages.

The object of my invention is to effect the circulation without the aid of mechanical drives. This problem is solved by conducting a part of the working medium, driven out at high pressure, into the system consisting of absorber and evaporator in such a manner that the gas present in this system is kept in motion. This is of course possible in such apparatus only when a higher pressure prevails in the boiler than in the evaporator and absorber. This difference in pressure can be maintained by the use of pumps. Columns of liquid may, however, also be employed in known manner in order to eliminate the mechanical drive here also.

Figure 1:
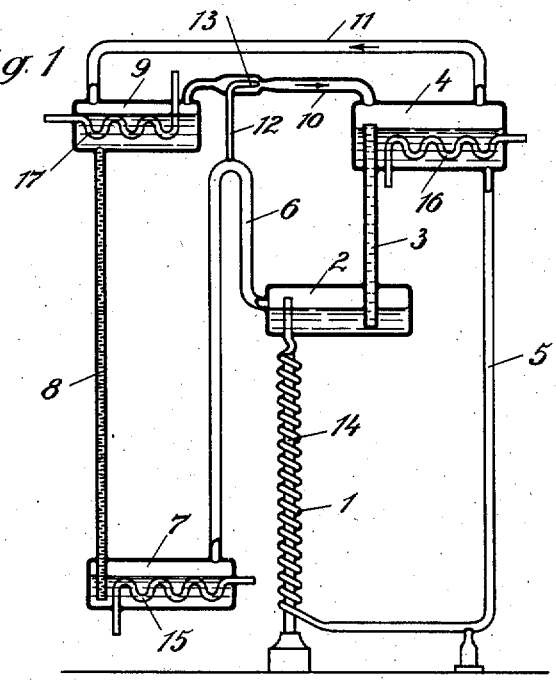
Figure 2:
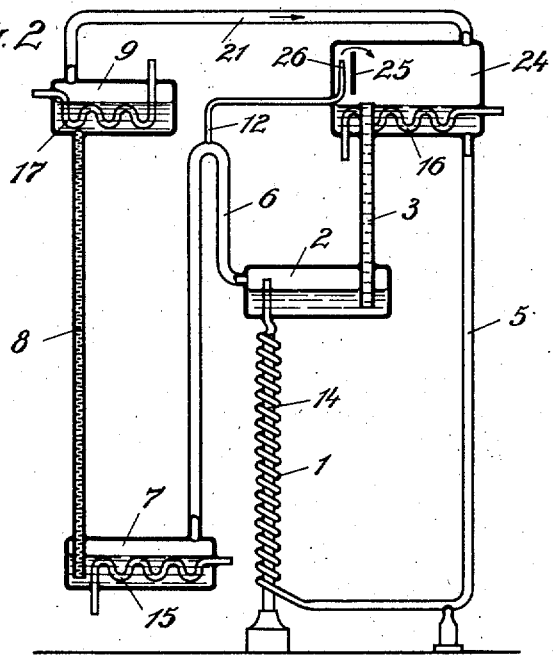

Two embodiments of my invention are diagrammatically illustrated in the drawing affixed to this specification and forming part thereof, and representing in Fig. 1 an apparatus in which the gas mixture in the evaporator and absorber is kept in circulation and Fig. 2 a modified apparatus in which the gas mixture in the absorber only is kept in continuous motion.

Like parts are indicated by like reference characters in both figures of the drawing.

Referring to Fig. 1, 1 is the boiling spiral or the boiler in which the refrigerant gas is expelled from the enriched solution, the gas passing into a gas separator 2 into which it also carries along the solution deprived of gas. This impoverised solution (indicated by spaced shading) ascends thence through a pipe 3 into the absorber 4, becomes enriched again with gas and descends again to the lower end of the boiling spiral 1 through a pipe 5. The gas driven off in the boiling spiral 1 and collecting in separator 2 passes through a gas pipe 6 into a condenser 7 and is condensed here. The liquid condensation product (indicated by close shading) ascends through a pipe 8 into the evaporator 9. Here it evaporates or vaporizes again. The gas generated flows, mixed with more or less foreign gases, through a pipe 10 into the absorber 4 as indicated by the arrow. The part of the gas mixture which is not absorbed returns into the evaporator through the pipe 11 in the direction of the arrow. From the pipe or conduit 6, a pipe 12 branches off which leads into the pipe or conduit 10 into which the gas flows in consequence of the higher pressure in separator 2. The outlet 13 and the pipe 10 are so shaped and constructed that a nozzle or ejector action is produced which sucks the gas from the evaporator 9 and forces it into the absorber 4.

The boiling spiral 1 is heated by an electric heating device 14. The heat of condensation liberated in the condenser 7 is conveyed away by a cooling coil 15 and the absorption heat generated in the absorber 4 by a cooling coil 16. The medium to be cooled flows through the cooling coil 17 which is provided within the evaporator 9. Preferably that portion of the gas driven off in the expeller or boiler spiral 1, and passing through pipe 12, is forced into the low pressure system in the direction from the evaporator 9 to the absorber 4, as shown in Fig. 1. If it should be blown so that it reaches first the evaporator it would be here cooled unnecessarily and the refrigerating work necessary for this purpose would be lost as useful refrigeration.

The foreign or inert gas admixed with the refrigerant vapor in the absorber 4 and the evaporator 9 reduces the difference of pressure between these two vessels on the one hand and the gas separation chamber 2 and the condenser 7 on the other hand. The columns of liquid in the pipes 3, 5, and 8 can be made shorter in correspondence with the reduction of the pressure difference whereby the total height of the entire machine or apparatus is diminished. Even when the reduction of the total height was not intended, it is frequently necessary to take accidental admixtures of foreign gases into account. It is, for instance, sometimes very difficult to keep the apparatus entirely free from air when a lower pressure than atmospheric pressure prevails in the absorber and the evaporator. In this case also the arrangement described is of great advantage.

If such small volumes of air are to be dealt with that they can be held without detriment by the absorber alone, it is frequently sufficient if the gas mixture contained in the absorber is kept in continuous motion. A suitable apparatus for the purpose is shown in Fig. 2. In the apparatus illustrated in this figure the absorber 24 is furnished with an enlarged gas chamber in order to make it to hold even a relatively large quantity of air which has penetrated into the apparatus. Within the gas chamber a vertical partition wall or baffle plate 25 is arranged which leaves a space for the passage of the gas mixture at both its upper and lower edges. At one side of this partition or baffle the nozzle 26 is arranged with the mouth directed upwards and which causes a gas circulation in the direction of the arrow shown. Owing to this continuously maintained motion of the gas the gas mixture cannot enrich itself with air directly above the level of the liquid in such a manner that the absorption is disturbed. Between the evaporator and the absorber there need only be a connecting pipe 21 through which the gas flows from the evaporator into the absorber as indicated by the arrow.

What I claim is:—

1. Method for transferring heat from a low temperature range to a higher temperature range, consisting in expelling a gas from an absorption liquid by heat at high pressure; liquefying one portion of the expelled gas by removing the heat of the higher temperature range; regasifying the liquefied gas at low pressure by supplying heat of the low temperature range; absorbing said gas by said absorption liquid in the presence of a neutral gas by removing from the gas heat of the higher range; introducing the other portion of the aforesaid expelled gas into said neutral gas to keep it in motion and absorbing also said other portion of the expelled gas by said absorption liquid in the presence of said neutral gas.

2. Method for transferring heat from a low temperature range to a higher temperature range, consisting in expelling a gas from an absorption liquid by heat at high pressure; liquefying one portion of the expelled gas by removing the heat of the higher temperature range; regasifying the liquefied gas at low pressure in the presence of a neutral gas by supplying heat of the low temperature range; absorbing said gas by said absorption liquid in the presence of said neutral gas by removing from the gas heat of the higher temperature range; introducing the other portion of the aforesaid expelled gas into said neutral gas to keep it in motion and absorbing also said other portion of the expelled gas by said absorption liquid in the presence of said neutral gas.

3. In an absorption apparatus the combination with a high pressure system, comprising a gas expeller adapted to receive an absorption liquid containing a refrigerant, and having means for heating said liquid to expel said refrigerant in gaseous form, a condenser having a connection with said expeller and having means for liquefying and cooling said expelled refrigerant; of a low pressure system comprising an evaporator connected with said condenser and adapted to receive said liquefied refrigerant and having heat supply means for regasifying said liquid refrigerant, an absorber having suitable connections with said expeller to receive from it the impoverished absorption liquid and to return to it the refrigerant-enriched absorption liquid, said absorber also containing a neutral gas and having at least one conduit connection with said evaporator to receive from it the regasified refrigerant, said absorber also having means for removing the heat due to absorption of the refrigerant by the impoverished liquid contained in the absorber, and a gas conduit between said high and low pressure systems for conducting a portion of the gaseous refrigerant expelled in the high pressure system directly into the low pressure system to maintain the gas mixture in at least a part of the low pressure system in circulation.

4. In an absorption apparatus the combination with a high pressure system, comprising a gas expeller adapted to receive an absorption liquid containing a refrigerant, and having means for heating said liquid to expel said refrigerant in gaseous form, a condenser having a connection with said expeller and having means for liquefying and cooling said expelled refrigerant; of a low pressure system comprising an evaporator connected with said condenser and adapted to receive said liquefied refrigerant and to also hold a neutral gas and having heat supply means for regasifying said liquid refrigerant, an absorber having suitable conduit connections with said expeller to receive from it the impoverished absorption liquid and to return to it the refrigerant-enriched absorption liquid, said absorber having conduit connections with said evaporator permitting the circulation of refrigerant and neutral gas mixture between the absorber and the evaporator, said absorber also having means for removing the heat due to absorption of the refrigerant by the impoverished liquid contained in the absorber, and a gas conduit between said high and low pressure system for conducting a portion of the gaseous refrigerant expelled in the high pressure system directly into the low pressure system to maintain the gas mixture in the low pressure system in circulation.

5. In an absorption apparatus the combination with a high pressure system, comprising a gas expeller adapted to receive an absorption liquid containing a refrigerant, and having means for heating said liquid to expel said refrigerant in gaseous form, a condenser having a connection with said expeller and having means for liquefying and cooling said expelled refrigerant; of a low pressure system comprising an evaporator connected with said condenser and adapted to receive said liquefied refrigerant and to also hold a neutral gas and having heat supply means for regasifying said liquid refrigerant, an absorber having suitable conduit connections with said expeller to receive from it the impoverished absorption liquid and to return to it the refrigerant-enriched absorption liquid, said absorber having conduit connections with said evaporator permitting the circulation of refrigerant and neutral gas mixture between the absorber and the evaporator, said absorber also having means for removing the heat due to absorption of the refrigerant by the impoverished liquid contained in the absorber, and a gas conduit connected at one end with said high pressure system to receive a portion of the gaseous refrigerant expelled in that system, the other end of said conduit having a nozzle terminating in one of the conduit connections between said evaporator and absorber for injecting said expelled refrigerant into the low pressure system to maintain a circulation of gas mixture therein in the direction from the evaporator to the absorber.

6. That improvement in the art of refrigerating through the agency of an absorption system including a generator, an evaporator and an absorber connected to afford circulation between them and containing a plurality of complementary diffusing agencies in the evaporator which consists in creating a liquid column pressure head within the system, producing circulation between the generator and absorber due to said head and circulating said plurality of agencies into and out of the evaporator.

7. Those steps in the process of refrigerating through the agency of an absorption system including a generator, an absorber and an evaporator which consist in building up a liquid column pressure gradient, circulating dissolved cooling agent between the generator and absorber due to said gradient and circulating an auxiliary agent between the absorber and evaporator in which the cooling agent evaporates.

8. That improvements in the art of refrigerating through the agency of an absorption system including a generator, an evaporator and an absorber connected to afford circulation between them and containing cooling agent and absorption liquid which consists in creating a liquid column pressure head within the system, producing circulation of absorption liquid between the generator and the absorber due to said head and introducing an auxiliary agent in the presence of which the cooling agent evaporates for equalizing the pressure in the system while maintaining a pressure difference due to liquid column.

9. A refrigerator comprising a generator and an absorber containing an absorption liquid, a condenser, an evaporator in which a cooling agent is evaporated in the presence of an auxiliary agent, and connections between the parts of the refrigerator arranged to form liquid column means for circulating absorption liquid between the generator and absorber and arranged to circulate the auxiliary agent between and through the evaporator and absorber.

10. In a continuous absorption refrigerating system, the combination of an evaporator, an absorber, conduits connecting the evaporator and the absorber and providing a path for the flow of inert gas in a circuit between the same, a nozzle located in one of said conduits and means for driving gas through said nozzle to exert force upon the gas in said conduit and thereby induce circulation of the gas.

11. In a continuous absorption refrigerating system the combination with an evaporator, an absorber, and conduit means providing a path for the flow of inert gas between the evaporator and the absorber of a nozzle and means for driving gas through said nozzle thereby tending to promote circulation of the inert gas between said evaporator and said absorber.

12. Absorption refrigerating apparatus comprising an evaporator, an absorber, a plurality of conduits for circulating gaseous fluid between said evaporator and said absorber, a condenser, and a conduit for conducting liquid from said condenser upwardly to said evaporator and adapted to hold a column of liquid.

13. Absorption refrigerating apparatus comprising an evaporator, an absorber, a plurality of conduits connected to said evaporator and to said absorber for circulating gaseous fluid therebetween, means for circulating said gaseous fluid due to force generated within the apparatus, a condenser disposed at a low level relative to said evaporator, and a conduit conducting liquid from said condenser upwardly to said evaporator and adapted to hold a column of liquid.

14. In an absorption refrigerating system including a boiler, a condenser, an evaporator and an absorber inter-connected for circulation of a refrigerant, a solvent therefor, and a gas inert with respect thereto, the improvement which consists in circulating the inert gas through the absorber and the evaporator and maintaining a higher pressure in the condenser than in the evaporator by interposing a liquid column between the condenser and the evaporator.

15. In absorption refrigerating apparatus including a boiler, a condenser, an evaporator and an absorber interconnected to form a system for circulation of refrigerant, the improvement which consists in maintaining a liquid column pressure gradient between the boiler and the evaporator less than what would correspond to the operating temperature difference therebetween, and equalizing the pressure difference corresponding to the remainder of the temperature difference by an auxiliary medium into which the refrigerant diffuses.

16. In absorption refrigerating apparatus including a boiler, a condenser, an evaporator and an absorber interconnected to form a system for circulation of refrigerant, the improvement which consists in maintaining a liquid column pressure gradient between the boiler and the evaporator less than what would correspond to the operating temperature difference therebetween, and equalizing the pressure difference corresponding to the remainder of the temperature difference by circulating a gas inert with respect to the refrigerant through the evaporator and the absorber.

17. Absorption refrigerating apparatus comprising a boiler, an absorber, a condenser, an evaporator, a plurality of conduits for circulating a gaseous fluid between said evaporator and said absorber, a conduit for conducting liquid upwardly from said condenser to said evaporator and adapted to hold a liquid column, means to conduct refrigerant vapor from the boiler to the condenser, and means to circulate liquid between and maintain a liquid column pressure gradient between the boiler and the absorber.

EDMUND ALTENKIRCH.